United States Patent
Subramaniam et al.

(10) Patent No.: US 12,028,576 B1
(45) Date of Patent: Jul. 2, 2024

(54) REMOTE SCHEDULING OF RECORDED CONTENT FOR DIGITAL VIDEO RECORDERS

(71) Applicant: Amazon Technologies, Inc., Seattle, WA (US)

(72) Inventors: Muthukumar Subramaniam, Chennai (IN); Surendran Rangasamy, Udumalpet (IN); Tarun Kumar, Chennai (IN); Shenbaga Prasanna, Tiruchirappalli (IN); Anantha Krishna Hodrali Srinivasa Bhatta, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 392 days.

(21) Appl. No.: 16/289,254

(22) Filed: Feb. 28, 2019

(51) Int. Cl.
*H04N 21/2747* (2011.01)
*H04N 21/426* (2011.01)
*H04N 21/458* (2011.01)

(52) U.S. Cl.
CPC ..... *H04N 21/4583* (2013.01); *H04N 21/2747* (2013.01); *H04N 21/4263* (2013.01)

(58) Field of Classification Search
CPC ........... H04N 21/4583; H04N 21/2747; H04N 21/4263
See application file for complete search history.

(56) References Cited

U.S. PATENT DOCUMENTS

| | | | | |
|---|---|---|---|---|
| 2004/0240858 | A1* | 12/2004 | Miyazaki | H04N 21/4334 348/E5.097 |
| 2010/0061708 | A1* | 3/2010 | Barton | H04N 21/4826 386/241 |
| 2017/0061443 | A1* | 3/2017 | Wolf | H04N 21/6143 |
| 2018/0070146 | A1* | 3/2018 | Curtis | H04N 21/26241 |

\* cited by examiner

*Primary Examiner* — Hsiungfei Peng
(74) *Attorney, Agent, or Firm* — Eversheds Sutherland (US) LLP

(57) ABSTRACT

Devices and methods are provided for remote scheduling of recorded content for digital video recorders. The device may determine a first channel, a first date, and a first time at which a first program will be presented. The device may determine a first recording schedule for a remote digital video recording (DVR) device, wherein the first recording schedule includes the first program at the first channel, the first date, and the first time. The device may receive a synchronization notification that the first recording schedule has been modified at the remote DVR device to include a second program to be recorded. The device may determine a second recording schedule, wherein the second recording schedule includes the second program at the second time. The device may send the second recording schedule to the remote DVR device.

20 Claims, 7 Drawing Sheets

REMOTE SCHEDULING OF RECORDED CONTENT FOR DIGITAL VIDEO RECORDERS

BACKGROUND

Digital video recording systems may not provide coordination between a digital video recorder and a remote system. Without coordination between a digital video recorder and a remote system, recording schedules may not be updated and communicated properly, leading to incorrect recordings, missed recordings, or conflicting recordings. For example, a remote system may not provide updated information to a digital video recorder, and the digital video recorder may not record the programming requested by a user.

Figure 1:
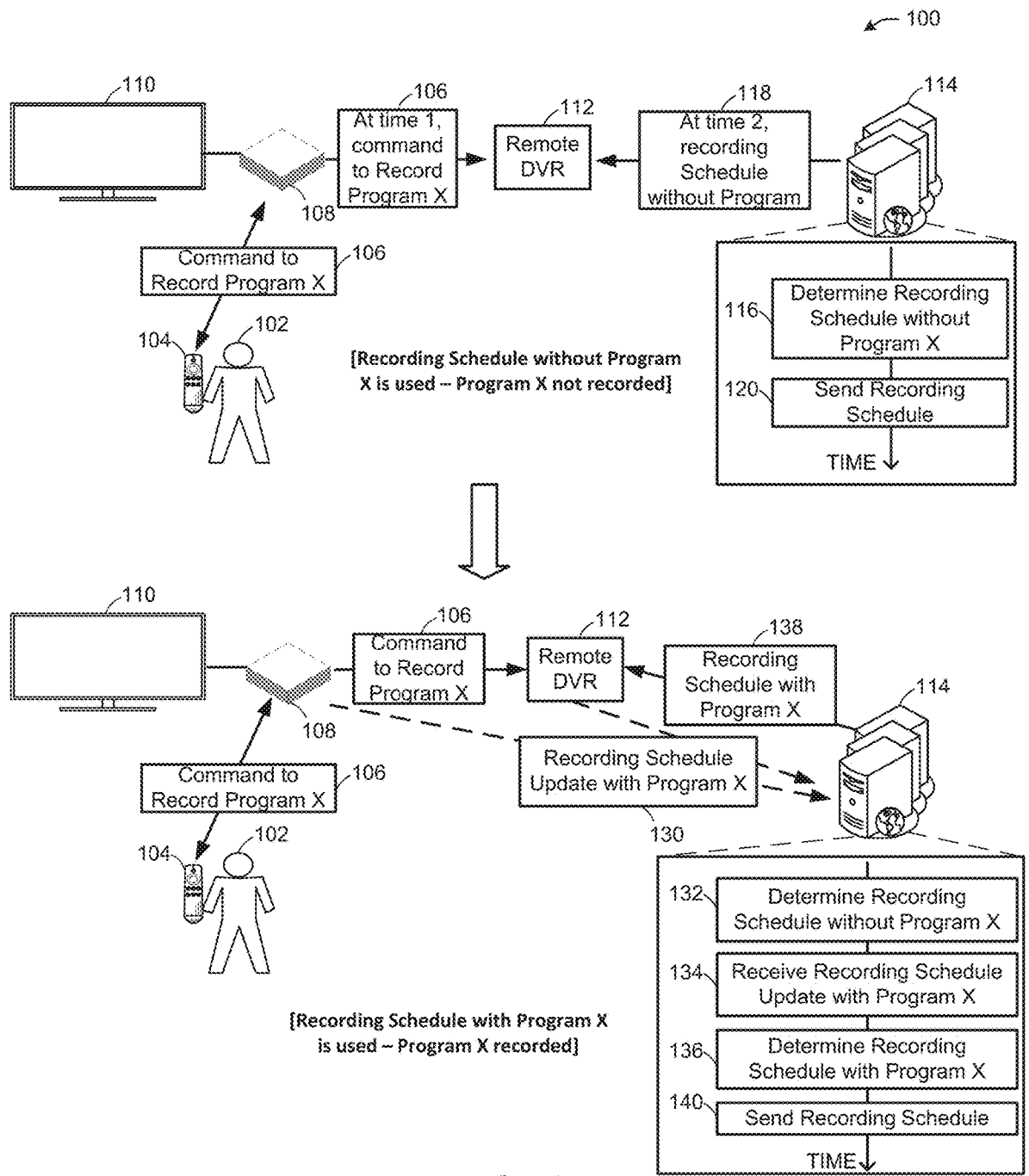
FIG. 1 illustrates an example process of remote scheduling of recorded content for digital video recorders (DVRs), in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for facilitating remote scheduling of recorded content for digital video recorders (DVRs). DVRs may be devices which may record live content, and store recorded content for playback on other devices. DVRs may include one or more tuners which may record over-the-air and live-streaming content. The DVRs may provide recorded content for playback to nearby or remote devices. When a user instructs a device connected to a DVR to record content, the DVR may set a recording schedule for an individual recording of the requested content or for a series recording of the requested content. Based on the recording schedule, the DVR may determine dates, times, and channels at which content is to be presented and may record content on those dates, times, and channels. Recording requests may be made to the connected devices, to the DVR, or to a remote service which communicates with the DVR.

A remote service may process commands received directly or from connected devices (e.g., using a remote control device). The remote service may translate commands into actions to be executed by the DVR and/or the connected devices. For example, a command to play recorded content from a DVR may result in an action causing the DVR to provide the requested content to a connected device, and an action causing the connected device to render the content provided by the DVR.

When a recording command is provided to a connected device, the command may be sent to the DVR and to the remote service for translation if the DVR is connected to the remote service at the time. If the remote service is not connected at the time, the remote DVR may set or update a recording schedule based on the recording command. The remote service may set or update a recording schedule based on commands and may update a recording schedule as new programming data becomes available. For example, a recording schedule may be set for a time period (e.g., two weeks), and may be updated periodically (e.g., hourly, daily, weekly) to provide the next recording dates, times, and channels for a program.

If a remote service does not provide an updated recording schedule to a DVR, the DVR may not set itself to record a program. For example, if a DVR has a recording schedule for the current week, but does not receive an updated recording schedule for the following week, the DVR may not set to record any programming the following week. The remote service may provide an updated recording schedule so that the DVR does not miss scheduled recordings. However, if the DVR receives a recording schedule update based on a user command while not connected to a remote service (e.g., using an offline mode or during a network outage), the remote service may not be aware of the recording schedule update and may provide an outdated recording schedule to the DVR, resulting in incorrect and/or missed recordings.

Recording commands may result in recording conflicts. For example, a DVR may be able to record a limited number of programs at a given time based on how many tuners the DVR has available. For example, a DVR with two tuners may be able to record two programs at the same time. If a recording request includes a third program which is presented at the same time as two other programs which are scheduled to record at the DVR, the DVR may have a conflict. A user may be prompted to resolve scheduling conflicts, or the scheduling conflicts may be resolved by the DVR and/or the remote service. If a conflict resolution process results in a changed date, time, and/or channel of a scheduled recording, the updated recording schedule should be communicated to both the DVR and the remote service to maintain an updated recording schedule and prevent an outdated recording scheduling schedule from being provided to the DVR.

In one or more embodiments, the remote service or the DVR may coordinate recording schedules. The remote service and/or the DVR may determine alternative dates, times, and channels for conflicting programs, and may update a recording schedule based on the alternative dates, times, and channels (e.g., a program recording may be moved to accommodate a conflicting recording). The remote service may determine, based on user accounts associated with recording requests, any DVR available (e.g., having an available tuner at a given time) to record a requested program. If one DVR is unavailable to record at a given time, but another DVR is available at that time, the remote service may schedule a recording at the other DVR to avoid the conflict. When a recording schedule is updated by a DVR or a remote service, the DVR or remote service may send notifications to each other to indicate the scheduling update.

In one or more embodiments, the remote service may update recording schedules for any DVR devices eligible to record content when updated scheduling information is received. For example, if a program is rescheduled to another date, time, and/or channel, the remote service may determine any DVRs scheduled to record the program, may update the respective recording schedules, and may send the updated recording schedules to the respective DVRs.

In one or more embodiments, a remote service may disambiguate recording commands to determine which DVRs are intended and which programs are intended by a command. When a remote service receives a recording command provided by a device connected to a DVR, the remote service may determine which DVR is intended for the command. In particular, if a connected device receives (e.g., via a remote control device) a recording command, the connected device may send the recording command to the remote service for translation, and the remote service may determine a program indicated by the recording command and which connected device provided the voice command. A user account may be associated with multiple DVRs, so when the remote service receives a recording command, the remote service may determine which DVR should record a program at a given time. The remote service may determine which DVR should record a program (e.g., which DVR to which a recording schedule should be provided) based on a signal strength between the remote service and an respective DVRs associated with the user account. When the remote service receives a recording command, the remote service may determine, based on the connected device which provided the command, the user account associated with the connected device. Based on the user's account, the remote service may identify any DVRs associated with the user account and may determine which DVR should record requested content.

In one or more embodiments, the remote service may determine which program is intended by a command. For example, if a command requests recording of "Die Hard," the remote service may identify multiple programs associated with Die Hard, including Die Hard 1, Die Hard 2, Die Hard, 3, and so on. The remote service may disambiguate a command to determine which Die Hard movie is associated with a command, or may return any related options to the connected device for user input. Using an existing recording schedule and/or previously recorded programs associated with a user account, the remote service may identify a program which matches the recording command and which was not already included in a previous recording schedule or was not previously recorded by a device associated with the user's account, and may select that program for recording.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example process 100 of remote scheduling of recorded content for DVRs, in accordance with one or more example embodiments of the present disclosure.

Referring to FIG. 1, the process 100 may include a user 102 using a remote control device 104 to send a command 106 to record a program (e.g., Program X). The remote control device 104 may send the command 106 to a device 108. The device 108 may be connected to a display 110 and may provide video content to the display 110 to be rendered. The device 108 may send the command 106 or a signal representative of the command 106 to a remote DVR 112 (e.g., a DVR separate from the device 108).

Still referring to FIG. 1, a remote service 114 may, at step 116, determine a recording schedule 118 which does not include Program X. For example, the remote service 114 may be unaware of the command 106 to record Program X because when the command 106 is received by the device 108, the device 108 may not be connected to the remote service 114. The device 108 may not be connected to the remote service 114 during a network outage or when using an offline mode, for example. An offline mode may refer to the device 108 providing content from the remote DVR 112 for playback, and the remote DVR 112 may receive and record over-the-air content during an offline mode. Because the remote service 114 does not receive an indication of the command 106, the remote service 114 may determine the recording schedule 118 for other programs previously requested to the remote service 114. For example, the command 106 may be received by the device 108 at a first time, and the remote service 114 may determine, at step 116, the recording schedule 118 at a second time later than the first time. If the remote service 114 were aware of the command 106 when determining the recording schedule 118 at the second time, the remote service 114 could include Program X in the recording schedule 118. Instead, the remote service 114 may, at block 120, send the recording schedule 118 after the command 106 was received by the device 108 and provided to the remote DVR 112. If the remote DVR 112 receives the recording schedule 118 after receiving the command 106, the remote DVR 112 may update scheduled recordings based on the later-received recording schedule 118, which may result in the remote DVR 112 not recording Program X as commanded by the user 102.

Still referring to FIG. 1, the device 108 (or the remote DVR 112) may allow the remote service 114 to account for the command 106 and reconcile the command 106 with any existing recording schedule. The device 108 or the remote DVR 112 may send a recording schedule update 130 indicating that Program X is to be recorded. At step 132, the remote service 114 may, at step 132, determine a recording schedule not including Program X. The remote service 114 may determine the recording schedule without Program X before processing the recording schedule update 130. For example, the remote service 114 may determine the recording schedule without Program X while the remote service 114 is not available to (e.g., not connected to) the device 108 or the remote DVR 112. The remote service 114 may, at block 134, receive the recording schedule update 130. The remote service 114 may receive the recording schedule update 130 after the connection between the remote service 114 and the device 108 or the remote DVR 112 has been reestablished. At block 136, the remote service 114 may determine another recording schedule 138 which includes Program X. At block 140, the remote service 114 may send the recording schedule 138 to the remote DVR 112 to instruct the remote DVR 112 to record Program X and any other programs included in the recording schedule 138. In this manner, the remote DVR 112 may record Program X as intended, and Program X may be available for playback at the display 110.

In one or more embodiments, the process 100 may include hybrid scheduling between the remote service 114, the remote DVR 112, and the device 108. Both the remote DVR 112 and the remote service 114 may maintain recording schedules as instructed by the device 108 and the remote service 114, which may receive recording commands indicating one or more programs (e.g., episodes, series, movies, sporting events, or other programs), channels, dates, and times instructing the remote DVR 112 to record. The remote service 114 may maintain recording schedules and update recording schedules when new recording commands are received (e.g., changes to existing schedules, newly added programs) and when electronic programming data is updated. For example, the remote service 114 may provide a recording schedule over a given time period (e.g., two weeks) for any programs that the user 102 has selected for recording. The remote service 114 may, as new electronic programming data becomes available (e.g., the next two weeks), identify when scheduled programs (e.g., a recorded series) are to be presented and recorded, and may determine and send an updated recording schedule to the remote DVR 112 periodically.

In one or more embodiments, certain types of commands (e.g., voice commands) may be translated by the remote service 114, so voice recording commands may cause the remote service 114 to determine recording schedules and send the recording schedules to the remote DVR 112. Other types of commands (e.g., touch commands using the remote control device 104) may cause the device 108 to instruct the remote DVR 112 to determine or adjust a recording schedule. When the remote service 114 is unavailable to the device 108 and/or the remote DVR 112, a recording command from the remote control device 104 may be processed by the device 108, resulting in an updated recording schedule at the remote DVR 112. So that the remote service 114 is made aware of the updated recording schedule and does not push a conflicting recording schedule to the remote DVR 112, the device 108 and/or the remote DVR 112 may send a notification to the remote service 114 that a recording schedule has been modified at the remote DVR 112.

In one or more embodiments, multiple customers may use the same remote DVR or share multiple remote DVRs. For example, the user 102 may not be the only user with an account associated with the remote DVR 112. When the remote service 114 receives the recording schedule update 130 or an indication of a recording update at the device 108 and/or the remote DVR 112, the remote service 114 may determine that multiple recordings are scheduled for the remote DVR 112 at a particular time. If the number of scheduled recordings exceeds the number of available tuners at the remote DVR 112, the remote service 114 may determine which recording receives priority. If multiple user account use the remote DVR 112, the priority may be based on a user account priority set by user preference, account use (e.g., the account which requests more recordings receives highest priority), account spending amount, or user input confirming account priority. A recording requested for a user account with higher priority may be recorded at the requested or earliest time, while a conflicting recording at the same time may be removed or moved to another date or time.

Figure 2:
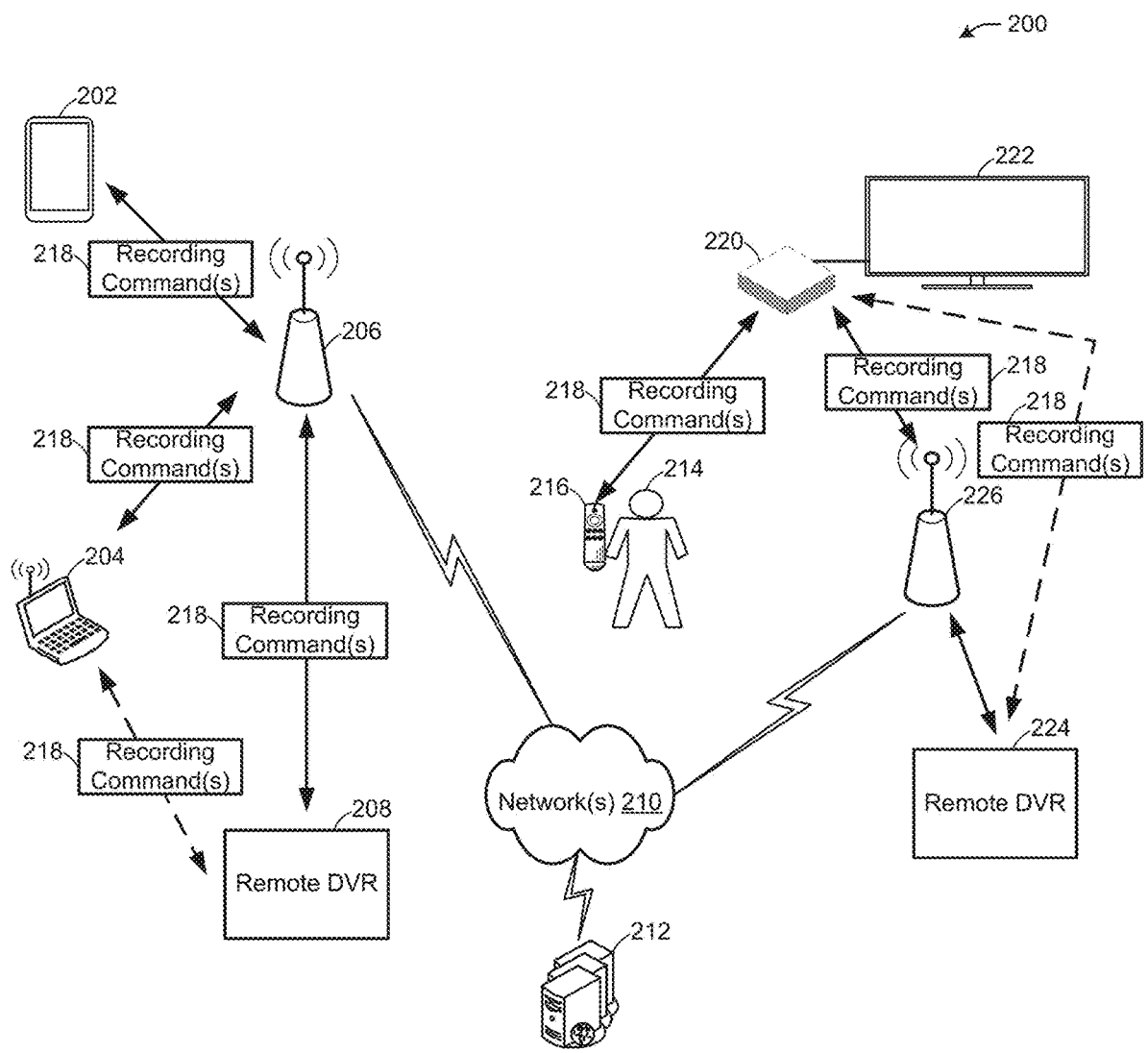
FIG. 2 illustrates a system for remote scheduling of recorded content for DVRs, in accordance with one or more example embodiments of the present disclosure.

FIG. 2 illustrates a system 200 for remote scheduling of recorded content for DVRs, in accordance with one or more example embodiments of the present disclosure.

Referring to FIG. 2, the system 200 may include one or more playback devices (e.g., playback device 202, playback device 204, playback device 222) which may connect via an access point (AP) (e.g., AP 206, AP 226) to one or more remote DVRs (e.g., remote DVR 208, (remote DVR 224), or may connect directly to the remote DVRs. For example, the AP 206 and the AP 226 may connect to one or more communications networks 210, which may be the same wireless network (e.g., an extended home network) or may be separate wireless networks, to host one or more wireless networks for playback devices and remote DVRs. Any playback device connected to the same wireless network as, or directly connected (e.g., using a peer-to-peer or other direct connection) to, a remote DVR may provide recording commands 218 to and may receive recorded content from a remote DVR. For example, the playback device 202, the playback device 204, a device 220, and/or a playback device 222 may send recording commands 218 to the remote DVR 208 and/or the remote DVR 224 to record a program.

A user 214 may use a remote control device 216 to send commands (e.g., recording command 218) to a device 220 (e.g., the remote control device 216 may be paired with the device 220), and the device 220 may provide video content to a playback device 222. The device 220 may send the received recording command 218 or a representation of the recording command 218 to the remote DVR 224 directly or through an AP 226. The device 220 may send the received recording command 218 or a representation of the recording command 218 to the remote DVR 208 using the one or more communication networks 210. The AP 206, the AP 226, the remote DVR 208, and/or the remote DVR 224 may be connected to the remote service 212 (e.g., one or more devices remote from the remote DVR 208 and the remote DVR 224) through the one or more communications networks 210.

The remote service 212 may serve multiple remote DVRs, including the remote DVR 208 and the remote DVR 224. Remote DVRs may be associated with different user accounts. For example, the remote DVR 208 and the remote DVR 224 may be associated with a user account for the user 214, or may be associated with different respective user accounts. The remote service 212 may maintain records of any remote DVRs and their associated user accounts, including a number of available tuners associated with each remote DVR (e.g., how many tuners are on a remote DVR for recording, and which tuners may be available on a remote DVR at a given date/time based on a recording schedule for the remote DVR). The AP 206 and the AP 226 may be the same AP or different APs, and may allow the playback device 202, the playback device 204, and the device 220 to send commands wirelessly to the remote DVR 208, the remote DVR 224, and the remote service 212.

The playback device 202 and the playback device 204 may send recording commands to the remote DVR 208 instructing the remote DVR 208 to record programs at given dates and times. The remote DVR 208 may receive and record over-the-air programming and streaming video, and the recorded programming may be available to the playback device 202, the playback device 204, the device 220, or any other device associated with the same user account, whether nearby or on another network.

The device 220 may receive commands from the remote control device 216 and may send those commands to the remote DVR 224 and the remote service 212. For example, if the device 220 receives a voice command from the remote control device 216, the device 220 may send the voice command to the remote service 212 for translation. The remote service 212 may translate the voice command into commands for respective devices, such as for the remote DVR 224 and the device 220. For example, if a voice command is a command to record a program, the remote service 114 may determine recording schedule and send the recording schedule to the remote DVR 224 to instruct the remote DVR 224 to record one or more programs at given channels, dates, and times. Other types of commands, such as touch or gestures commands from the remote control device 216, may be processed by the device 220. If such commands are recording commands, or if the remote service 212 is unavailable to receive commands from the device 220, the device 220 may translate recording commands and instruct the remote DVR to update a recording schedule. The device 220 may receive playable content recorded at the remote DVR 224 and provide the content to the playback device 222 for rendering, and may receive streaming video and provide the streaming video to the playback device 222 for rendering.

In a setup phase, the remote service 212 may receive and determine any user account and device credentials. For example, the remote service 212 may determine any user accounts and associated remote DVRs which may receive recording schedules. The remote service 212 may scan any possible programming streams that it may receive, may determine a transmission stream identifier and call sign identifier of any respective channels, may determine electronic programming data and associated metadata (e.g., titles, synopsis, actors/actresses, and other relevant data) for each channel and program at a given date/time, and may use such information to determine recording schedules for remote DVRs based on the recording requests received for respective remote DVRs.

Because of the setup phase, the remote service may be able to determine recording schedules for any remote DVR. For example, when the remote service 212 receives the next days or weeks' worth of programming data, including the programming date, time, channel, and metadata for Program X, any user accounts whose recording preferences indicate that Program X is to be recorded may be identified by the remote service 212, and the remote service 212 may determine respective recording schedules for each user account based on available remote DVR tuners at the given date/time when Program X is to be presented. Recordings may be for individual episodes or blocks of time, or may include series recordings in which any episodes of a program within a time period are recorded.

The remote service 212 may reconcile recording schedule conflicts with the remote DVR 208 and the remote DVR 224. For example, if the recording command 218 includes Program X, the remote service 212 may determine channels, dates, and times when Program X is to be presented. The remote service 212 may determine that the recording command 218 was received from the device 220, and may determine a user account associated with the device 220. Based on the user account, the remote service 212 may determine that the remote DVR 208 and the remote DVR 224 may record Program X. The remote service 212 may determine how many tuners the remote DVR 208 and the remote DVR 224 have. Based on an existing recording schedule for the remote DVR 208 and the remote DVR 224, the remote service 212 may determine how many programs are scheduled to record by the remote DVR 208 and the remote DVR 224 at the same date and time as Program X. If the total number of programs, including Program X, to record at either the remote DVR 208 or the remote DVR 224, then the respective remote DVR may be unavailable at that date at time to record program X. If one of the remote DVRs has an available tuner to record Program X at the presentation date/time of Program X, then the remote service 212 may update a recording schedule for the available remote DVR and may send the updated recording schedule to the available remote DVR. If no available tuners of any remote DVRs are available, the remote service 212 may look for other dates and times when Program X or a conflicting program recording are to be presented, and may adjust a recording schedule based on the time when recording commands for the respective programs are received, user preferences, series and individual episode preferences, how often a program or program type is watched, or based on a user response to a prompt asking for a selection between conflicting scheduled recordings.

When the device 220 processes a recording command and causes the remote DVR 224 to update a recording schedule, the device 220 or the remote DVR 224 may update the remote service 212 of the recording schedule update. If the remote service 212 is unavailable when a recording schedule update is made at the remote DVR 224, the device 220 and the remote DVR 224 may send the update to the remote service 212 when a connection is reestablished. If the remote service 212 has determined a recording schedule after the recording schedule update was made at the remote DVR 224, to avoid the remote service 212 sending the outdated recording schedule to the remote DVR 224 and overriding the recording schedule update, the signals sent between devices may use timestamps (e.g., Lamport timestamps). If the remote service 212 receives a recording schedule update from the device 220 or the remote DVR 224, the remote service 212 may identify the timestamp of the update and may determine that the update was not accounted for in the last recording schedule determined by the remote service 212. The remote service 212 may reconcile an existing recording schedule for the remote DVR 224 by accounting for the received recording schedule update, and may send a new recording schedule to the remote DVR 224, the new recording schedule including the recording schedule update.

The remote service 212 may disambiguate commands such as recording commands to determine, for example, which program is intended by a command to be recorded and which device (e.g., remote DVR) may be assigned to record the intended program. When the remote service 212 receives a recording command provided by the device 220, for example, the remote service 212 may determine which DVR is intended for the command (e.g., the remote DVR 224 or the remote DVR 208). In particular, if the device 220 receives (e.g., via the remote control device 216) the recording command 218, the device 220 may send the recording command 218 to the remote service 212 for translation, and the remote service 212 may determine a program indicated by the recording command 218 and that the device 220 provided the recording command 218. A user account may be associated with multiple DVRs, so when the remote service 212 receives the recording command 218, the remote service 212 may determine which DVR should record a program at a given time. The remote service 212 may determine which DVR should record a program (e.g., which DVR to which a recording schedule should be provided) based on a signal strength between the remote service 212 and an respective DVRs associated with the user account. When the remote service 212 receives the recording command 218, the remote service 212 may determine, based on the device 220 which provided the command, the user account associated with the device 220. Based on the user's account, the remote service 212 may identify any DVRs associated with the user account and may determine which DVR should record requested content.

In one or more embodiments, the remote service may determine which program is intended by a command. For example, if a command requests recording of "The Marvelous Mrs. Maisel," the remote service may identify multiple seasons and episodes including that title. The remote service may disambiguate a command to determine which season or episode is associated with a command, or may return any related options to the connected device for user input. Using an existing recording schedule and/or previously recorded programs associated with a user account, the remote service may identify a program which matches the recording command and which was not already included in a previous recording schedule or was not previously recorded by a device associated with the user's account, and may select that program for recording.

In one or more embodiments, the playback device 202, the playback device 204, and/or the device 220 may include a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list. The device 220 may receive and translate signals from the remote control device 216, such as infrared, optical, or other signals or gestures, and may send signals to the remote service 212 for translation or may send commands to devices such as the playback device 222 and the remote DVR 224. The device 220 may provide a video stream to the playback device 222 for playback, and may provide recorded video from the remote DVR 224 to the playback device 222 for playback. The device 220 may be connected wirelessly or with wiring to the playback device 222 using audio and video connections, such as HDMI, stereo, mono, and other types of connections. The playback device 222 may include an application with at least some of the capabilities of the device 220 which may receive commands from the remote control device 216, receive and play video content from the remote DVR 224 or streaming video, may connect with the remote service 212 using the one or more communication networks 210, may connect with the remote DVR 224 directly or through the AP 226, and may connect directly with the remote control device 216.

In one or more embodiments, the remote control device 216 may include any combination of buttons, touch pads, touch screens, microphones, motion sensors, accelerometers, and other input devices able to detect touches, movements, sounds, and gestures on or with the remote control device 216. The remote control device 216 may receive inputs and translate the inputs into commands, such as infrared, optical, or other types of signals. The remote control device 216 may connect to the device 220 using Bluetooth, peer-to-peer, Wi-Fi, or other connections. The remote control device 216 may receive commands and other inputs from the device 220, such as media configurations and command signal mappings used to translate commands received by the remote control device 216 into signals to send to the device 220 or any other device, such as the playback device 222 or other associated devices.

Any of the playback devices (e.g., the playback device 202, the playback device 204, the playback device 222), the AP 206, and/or the AP 226 may be configured to communicate with each other via one or more communications networks 210 wirelessly or wired. Any of the communications networks 210 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 210 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 210 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the playback devices (e.g., the playback device 202, the playback device 204, the playback device 222), the AP 206, and/or the AP 226 may include one or more communications antennas. The one or more communications antennas may be any suitable type of antennas corresponding to the communications protocols used by the playback devices (e.g., the playback device 202, the playback device 204, the playback device 222), the AP 206, and/or the AP 226. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, or the like. The one or more communications antennas may be communicatively coupled to a radio component to transmit and/or receive signals, such as communications signals to and/or from the playback devices (e.g., the playback device 202, the playback device 204, the playback device 222), the AP 206, and/or the AP 226.

Any of the playback devices (e.g., the playback device 202, the playback device 204, the playback device 222), the AP 206, and/or the AP 226 may include any suitable radio and/or transceiver for transmitting and/or receiving radio frequency (RF) signals in the bandwidth and/or channels corresponding to the communications protocols utilized by any of the playback devices (e.g., the playback device 202, the playback device 204, the playback device 222), the AP 206, and/or the AP 226 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards.

In one or more embodiments, the remote DVR 208 and the remote DVR 224 may receive streaming video using the one or more communication networks 210, and may receive over-the-air programming using one or more antennas (not shown). The remote DVRs may include one or more tuners which may receive audio and video signals which may be played and recorded. The number of programs that a remote DVR may record at a given time may depend on the number of tuners the remote DVR has. A remote DVR may receive commands and recording schedules from the playback device 202, the playback device 204, the device 220, the playback device 222, and the remote service 212. The remote DVRs may receive wireless signals which include programs, channels, dates, times, associated metadata, and may translate instructions/commands into processes such as providing stored content, setting a tuner to a particular channel, recording received content at scheduled channels, dates, and times, erasing recorded content, and other functions. Recording schedules received by the remote DVRs may cause the remote DVRs to record programs as indicated by the recording schedules. For example, if a recording schedule indicates that a remote DVR should record a channel at a date and time, the remote DVR may set a tuner to record the channel at the date and time as instructed by the recording schedule.

Figure 3:
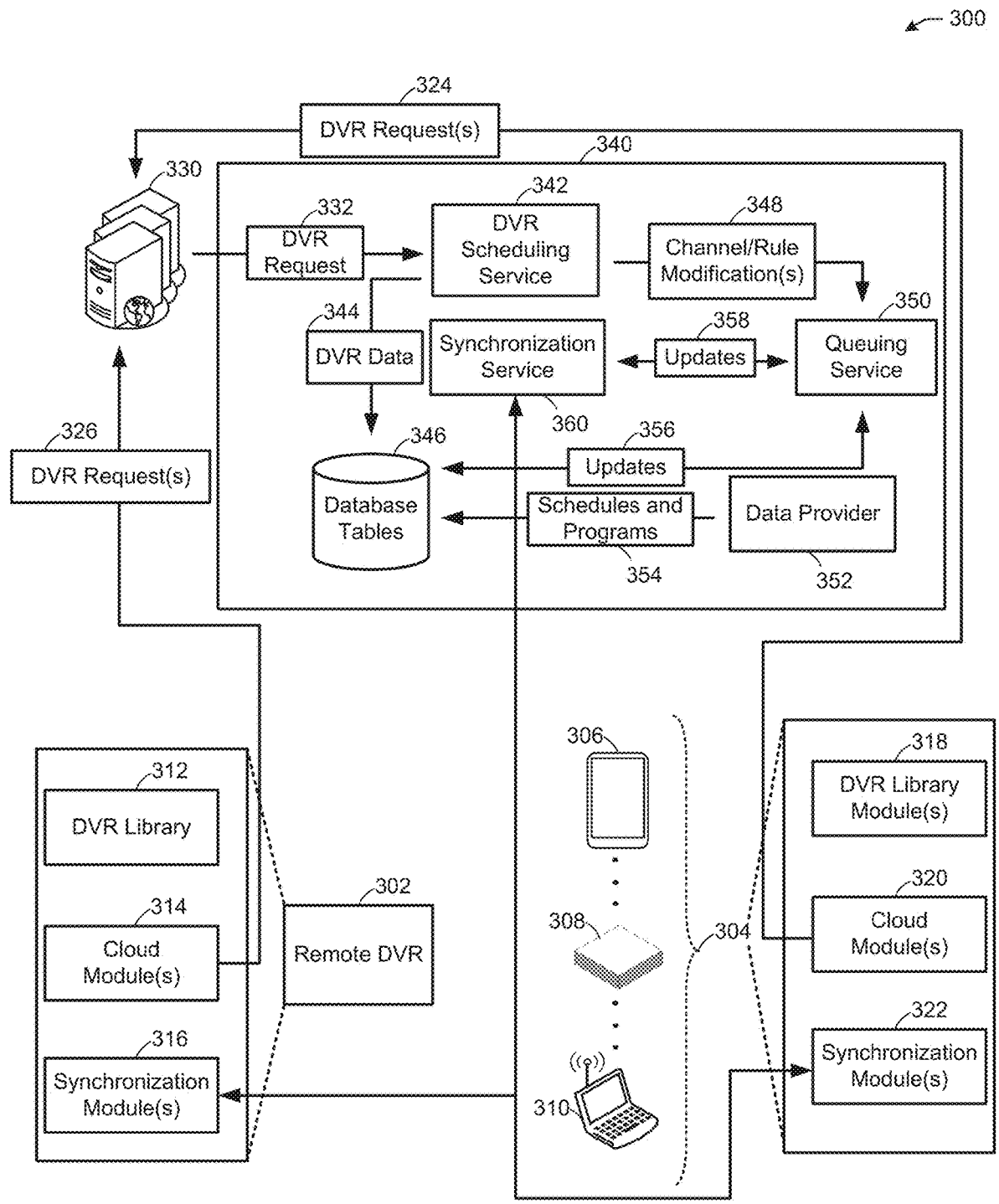
FIG. 3 illustrates a system for remote scheduling of recorded content for DVRs, in accordance with one or more example embodiments of the present disclosure.

FIG. 3 illustrates a system 300 for remote scheduling of recorded content for DVRs, in accordance with one or more example embodiments of the present disclosure.

Referring to FIG. 3, the system 300 may include a remote DVR 302 which may record and provide content for playback at one or more playback devices 304 (e.g., playback device 306, playback device 308, playback device 310). The remote DVR 302 may include a DVR library 312 (e.g., to store recorded content), one or more cloud modules 314 (e.g., to facilitate communication between the remote DVR 302 and a remote service), and one or more synchronization modules 316 (e.g., to facilitate recording schedule synchronization between the remote DVR 302, the one or more playback devices 304, and a remote service). The one or more playback devices 304 may include one or more DVR library modules 318 (e.g., to facilitate reception and playback of recorded content from the remote DVR 302), one or more cloud modules 320 (e.g., to facilitate communication between the one or more playback devices 304 and a remote service), and one or more synchronization modules 322 (e.g., to facilitate recording schedule synchronization between the remote DVR 302, the one or more playback devices 304, and a remote service). The one or more playback devices 304 may use the one or more cloud modules 320 to send one or more DVR requests 324 to one or more servers 330. The remote DVR 302 may use the one or more cloud modules 314 to send one or more DVR requests 326 to the one or more servers 330. The one or more DVR requests 324 and the one or more DVR requests 326 may include recording requests including programs, channels, dates, times, and other information.

Still referring to FIG. 3, the one or more servers 330 may send DVR requests 332 to a remote service 340 (e.g., remote service 114 of FIG. 1, remote service 212 of FIG. 2). The remote service 340 may include a DVR scheduling service 342, which may send DVR data 344 to database tables 346. The DVR scheduling service 342 may send channel/rule modifications 348 to a queuing service 350. The remote service 340 may include a data provider 352, which may provide schedules and programs 354 (e.g., recording schedules and program updates) to the database tables 346. The database tables 346 and the queuing service 350 may exchange updates 356 (e.g., read/write data, dataset updates). The queuing service 350 may exchange updates 358 (e.g., dataset updates) with a synchronization service 360 of the remote service 340. The synchronization service 360 may provide messages to the synchronization modules 316 and/or the synchronization modules 322 to synchronize recording instructions and recording schedules. The synchronization modules 316 and/or the synchronization modules 322 may upload data to or download data from the synchronization service 360 (e.g., using an active programming interface).

The DVR requests 326 and the DVR requests 324 may include recording requests (e.g., the recording commands 218 of FIG. 2). The remote service 340 may receive commands (e.g., voice commands) from the one or more playback devices 304, may translate the commands into instructions, and may send DVR-related instructions like "record a program" and "cancel recording," to the remote DVR 302. The remote service 340 may receive commands to delete recordings and may disambiguate the delete commands to identify which programs to delete from which recording schedules or DVR devices as described above with regard to determining which programs to record and to which remote DVRs to send recording schedules.

The remote DVR 302 and the one or more playback devices 304 may be paired in near field situation, far field situations, and headless situations (e.g., when software is capable of executing without a graphical user interface). The remote service 340 may store device pairings with the remote DVR 302 and direct instructions to the appropriate end point for the remote DVR 302. If a recording command is received by the remote service 340 from a device, the remote service 340 may determine a user account for the device and may determine which remote DVR (e.g., if there are multiple) to instruct. In a headless case, any remote DVRs associated with an account may be considered for a recording instruction received by the remote service 340. In a near field, far field, or other paired case, a remote DVR paired with the device from which the recording command was received by the remote service 340 may be considered for a recording instruction. When the remote service 340 determines to which remote DVR to send a recording schedule or instruction, the remote service 340 may consider any remote DVRs on an associated account or specific remote DVRs paired to particular types of devices, including the device from which a recording command is received at the remote service 340.

In one or more embodiments, the DVR scheduling service 342 may receive the DVR requests 332 from the one or more servers 330. The DVR scheduling service 342 may resolve over-the-air stations and publish channels for available programming. The DVR scheduling service 342 may verify user accounts with access tokens, register and de-register remote DVRs and connected devices, and may facilitate scheduling of recordings for remote DVRs. The DVR scheduling service 342 may read and write data (e.g., DVR data 344) to the database tables 346 for storage. When devices are registered and de-registered, the channel/rule modifications 348 may be provided to the queuing service 350 to indicate which devices have access to particular programs and channels.

In one or more embodiments, the database tables 346 may store the schedules and programs 354 received from the data provider 352, along with rule data, device data, data sets. When the database tables 346 receive updated programming or schedules, the remote service 340 may execute a function to cause the queuing service 350 to provide an updated recording schedule to the synchronization service 360, which may provide the recording schedule to the remote DVR 302 and/or the one or more playback devices 304. When the synchronization service 360 receives recording schedule updates from the remote DVR 302 and/or the one or more playback devices 304, the updates may be provided to the database tables 346, and the remote service 340 may resolve any recording conflicts with a recording schedule for the remote DVR 302. The remote service 340 may use the information stored in the database tables 346 to determine recording schedules, which DVR devices to receive respective recording schedules, to reschedule recordings in cases of recording conflicts, and to determine when a recording schedule has been modified/updated at the remote DVR 302 (e.g., during an offline usage or during a network disconnection).

Figure 4:
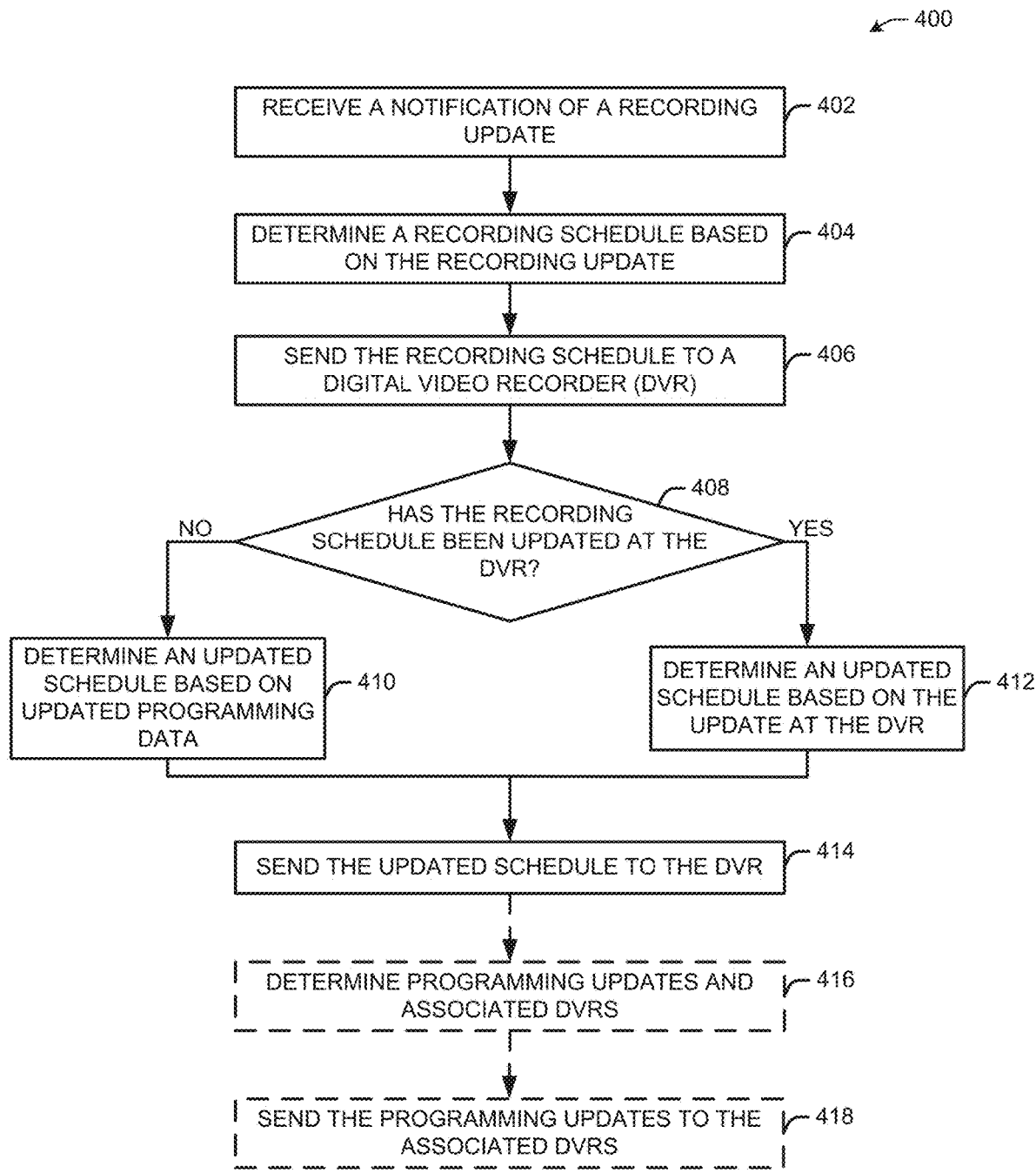
FIG. 4 illustrates a flow diagram for a process for remote scheduling of recorded content for DVRs, in accordance with one or more example embodiments of the present disclosure.

FIG. 4 illustrates a flow diagram for a process 400 for remote scheduling of recorded content for DVRs, in accordance with one or more example embodiments of the present disclosure.

At block 402, processing circuitry of a device or system (e.g., the remote service 114 of FIG. 1, the remote service 212 of FIG. 2, the remote service 340 of FIG. 3) may receive a notification of a recording update (e.g., the recording command 218 of FIG. 2). The recording request may be received from a device (e.g., the device 220 of FIG. 2), and may have originated from a remote control device (e.g., the remote control device 216 of FIG. 2). The recording request may be in the form of a voice command or wireless signal, and may include a program, a channel, a date, a time, an action (e.g., record, cancel, delete, add, reschedule, etc.) associated with causing recording, changing a recording scheduling, or removing a scheduled recording, for example. The processing circuitry may translate the recording request into instructions for a device. The instructions may include recording instructions for a remote DVR (e.g., the remote DVR 224 of FIG. 2), such a recording schedule which includes programs and the respective dates, times, and channels to record the programs. The notification of a recording update may be based on synchronization of the device or system and another device, based on an indication that a recording was requested at another device, or based on a received update of programming data (e.g., the next week of programming data).

At block 404, the processing circuitry may determine one or more recording schedules based on the recording request. The processing circuitry may determine, based on the recording command (e.g., which may indicate the device which sent the recording command), a user account associated with the device which sent the recording command. Based on the user account, the processing circuitry may identify any associated remote DVRs for the user account. The processing circuitry may determine which programs and/or remote DVRs (e.g., using disambiguation) are intended by the recording request. Using a broadcast television programming schedule, the processing circuitry may identify any channel, date, and time when the identified programming is to be presented and may be recorded. The processing circuitry may determine whether a remote DVR associated with the recording request has any available tuners to record the identified programming at the presented channels, dates, and times. For example, the processing circuitry may look for the first date and time at which the program will be presented and determine if any tuners of any remote DVRs associated with the user account may be available to record at that time. If any remote DVR tuners are available to record the identified programming, the processing circuitry may update a recording schedule for the available remote DVR. If no remote DVR tuners are available to record the identified programming because of a scheduling conflict, the processing circuitry may identify another date or time for the identified programming or for the conflicting programming, and may determine a recording schedule using the alternative date/time.

At block 406, the processing circuitry may send the recording schedule to the remote DVR identified as available or as the target for the recording command. The recording schedule may be sent periodically (e.g., as new electronic programming data for coming days or weeks becomes available), or in response to the recording request. The recording schedule may include programs, channels, dates, and times for the remote DVR to record.

At block 408, the processing circuitry may determine whether the recording schedule for the remote DVR has been updated at the DVR. For example, if the remote DVR and any associated devices are operating in an offline mode or if the network connection is lost between the remote DVR and the device or system, or if a recording command is processed locally (e.g., by the device 220 of FIG. 2) and causes the remote DVR to change the recording schedule provided by the device or system, the remote DVR or associated device (e.g., the device 220 of FIG. 2) may send an indication that the recording schedule was modified at the remote DVR. For example, a schedule recording may be added to, deleted from, or changed to another channel, date, or time in the recording schedule sent to the remote DVR (e.g., during an offline mode or network disconnection). If the device or system is unaware of the schedule modification made at the remote DVR, the device or system may determine a recording schedule which does not include the modification and therefore may be outdated, and may send the outdated recording schedule to the remote DVR to implement. If the recording schedule has not been modified at the remote DVR, the process 400 may continue at block 410. If the recording schedule has been modified at the remote DVR, the process 400 may continue at block 412. It should be noted that the indication that the recording schedule has been modified at the remote DVR may be different than a command passed on by the remote DVR or another device to the device or system to be translated into a recording request which results in generating a recording schedule. Instead, the indication that the recording schedule has been modified at the remote DVR may indicate the program, channel, date, and/or time of a recording along with a timestamp which the processing circuitry may use to identify that the recording schedule update at the remote DVR was not accounted for by the device or system.

At block 410, the processing circuitry may determine an updated recording schedule based on updated programming data. For example, if the recording schedule sent at block 406 includes recordings for two weeks of programming data, the processing circuitry may determine the next two weeks of recordings for a recording schedule when the programming data becomes available. At block 412, the processing circuitry may determine an updated recording schedule based on the update made at the remote DVR. The updated recording schedule may combine next recordings based on new programming data and based on any updated recordings made at the remote DVR. The updated recording schedule may remove any canceled recordings and include any newly added recordings based on any recording commands received after sending the previous recording schedule at block 408. At block 414, the processing circuitry may send the updated schedule to the remote DVR.

At block 416, the processing circuitry may determine any programming updates and remote DVRs able to receive the programming. For example, the next days or weeks of electronic programming data may be received, and the processing circuitry may determine any recording schedules which include scheduled recordings for any of the programs in the electronic programming data. The processing circuitry may determine if any programs have changed schedules (e.g., are being presented at a different date or time than usual or than previously scheduled) and may determine respective updated recording schedules for any remote DVRs intended to record the programs. At block 418, the processing circuitry may send the programming updates (e.g., updated programming schedules) to the relevant remote DVRs intended to record the programming indicated by the recording schedules.

Figure 5:
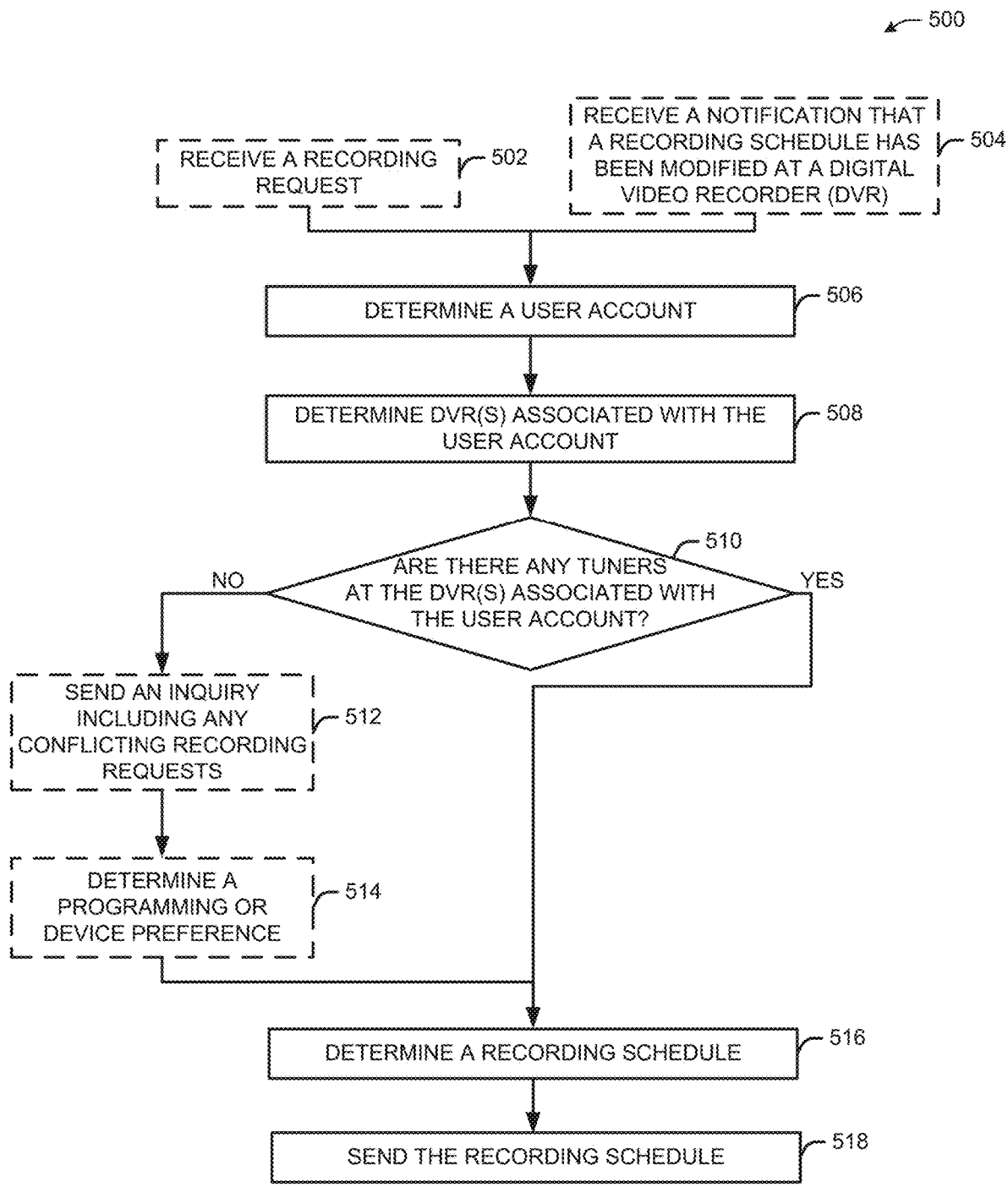
FIG. 5 illustrates a flow diagram for a process for remote scheduling of recorded content for DVRs, in accordance with one or more example embodiments of the present disclosure.

FIG. 5 illustrates a flow diagram for a process 500 for remote scheduling of recorded content for DVRs, in accordance with one or more example embodiments of the present disclosure.

At block 502, processing circuitry of a device or system (e.g., the remote service 114 of FIG. 1, the remote service 212 of FIG. 2, the remote service 340 of FIG. 3) may receive a recording request. The recording request may be received from a device (e.g., the device 220 of FIG. 2), and may have originated from a remote control device (e.g., the remote control device 216 of FIG. 2). The recording request may be in the form of a voice command or wireless signal, and may include a program, a channel, a date, a time, an action (e.g., record, cancel, delete, add, reschedule, etc.) associated with causing recording, changing a recording scheduling, or removing a scheduled recording, for example. The processing circuitry may translate the recording request into instructions for a device. The instructions may include recording instructions for a remote DVR (e.g., the remote DVR 224 of FIG. 2), such a recording schedule which includes programs and the respective dates, times, and channels to record the programs.

At block 504, the processing circuitry may receive a notification that a previously provided recording schedule has been modified at a remote DVR (e.g., the remote DVR 224 of FIG. 2). For example, if the remote DVR and any associated devices are operating in an offline mode or if the network connection is lost between the remote DVR and the device or system, or if a recording command is processed locally (e.g., by the device 220 of FIG. 2) and causes the remote DVR to change the recording schedule provided by the device or system, the remote DVR or associated device (e.g., the device 220 of FIG. 2) may send an indication that the recording schedule was modified at the remote DVR. For example, a schedule recording may be added to, deleted from, or changed to another channel, date, or time in the recording schedule sent to the remote DVR (e.g., during an offline mode or network disconnection). If the device or system is unaware of the schedule modification made at the remote DVR, the device or system may determine a recording schedule which does not include the modification and therefore may be outdated, and may send the outdated recording schedule to the remote DVR to implement.

At block 506, the processing circuitry may determine a user account. The processing circuitry may determine, based on the recording command (e.g., which may indicate the device which sent the recording command) or the notification that the recording schedule was modified at the remote DVR, a user account associated with the device which sent the recording command. Based on the user account, the processing circuitry may identify any associated remote DVRs for the user account.

At block 508, the processing circuitry may determine which programs and/or remote DVRs (e.g., using disambiguation) are associated with the user account. The processing circuitry may determine whether a remote DVR associated with the recording request has any available tuners to record the identified programming at the presented channels, dates, and times.

At block 510, the processing circuitry may For example, the processing circuitry may determine if any tuners of any remote DVRs associated with the user account may be available to record at that time. For example, for a given remote DVR, the processing circuitry may identify the number of programs scheduled to record at a given date/time. If the number of programs scheduled to be recorded by a remote DVR at a date/time is greater than the number of tuners on the remote DVR, then the remote DVR may not be available to record at that date/time, and the process 500 may proceed to block 512 If any remote DVRs, including a remote DVR associated with a user account but not originally intended by a recording command, are available at a date/time, the process 500 may proceed to block 516. If the processing circuitry is unable to determine which available remote DVR to use, either because there are multiple available remote DVRs or because an available remote DVR is different than the remote DVR intended by a recording command, the processing circuitry may use user preferences, user history, connection strengths with available remote DVRs, and other information to determine a recording schedule at block 514, or may proceed to block 512.

At block 512, the processing circuitry may send an inquiry including any conflicting recording requests (e.g., program inquiries or remote DVR inquiries) to be displayed by a playback device (e.g., the playback device 222 of FIG. 2). The inquiry may prompt a user (e.g., the user 214 of FIG. 2) to select from possible programs matching a recording request at given dates, times, and channels, and/or to select which remote DVR to use to record the selected program. Upon receiving one or more user selections, the process 500 may proceed to block 516. If block 512

At block 514, if block 512 is skipped, the processing circuitry may determine a programming or device preference to determine which program to record, on which channel, at which date/time, and using which remote DVR. For example, the processing circuitry may determine the remote DVR to record a program based on a stored user preference, past user history (e.g., which remote DVR receives the most recording requests, etc.), and/or signal strength of a connection with a remote DVR. For example, if the signal strength between the device or service and one remote DVR is stronger than the signal strength between the device or service and another remote DVR, the first DVR with the stronger connection may be selected to record a program.

At block 516, the processing circuitry may determine a recording schedule. If block 512 is used, the processing circuitry may receive one or more user selections clarifying which program to record at which channel, at which date/time, and/or which remote DVR to record the program. If block 514 is used, the programming and/or device preferences may be used to identify which program to record at which channel, at which date/time, and/or which remote DVR to record the program. If there are available remote DVR tuners at block 510 and no conflicts or missing information to determine which available remote DVR tuner to use to record a program, the processing circuitry may assign an available remote DVR to record a program. The programming schedule may be determined for the selected remote DVR, and may indicate programs, channels, times, dates, metadata, and other associated information to facilitate recording by the selected remote DVR. At block 518, the processing circuitry may send the recording schedule to the remote DVR. Sending the schedule may include sending messages to a synchronization module (e.g., the synchronization modules 316 of FIG. 3) of the remote DVR.

Figure 6:
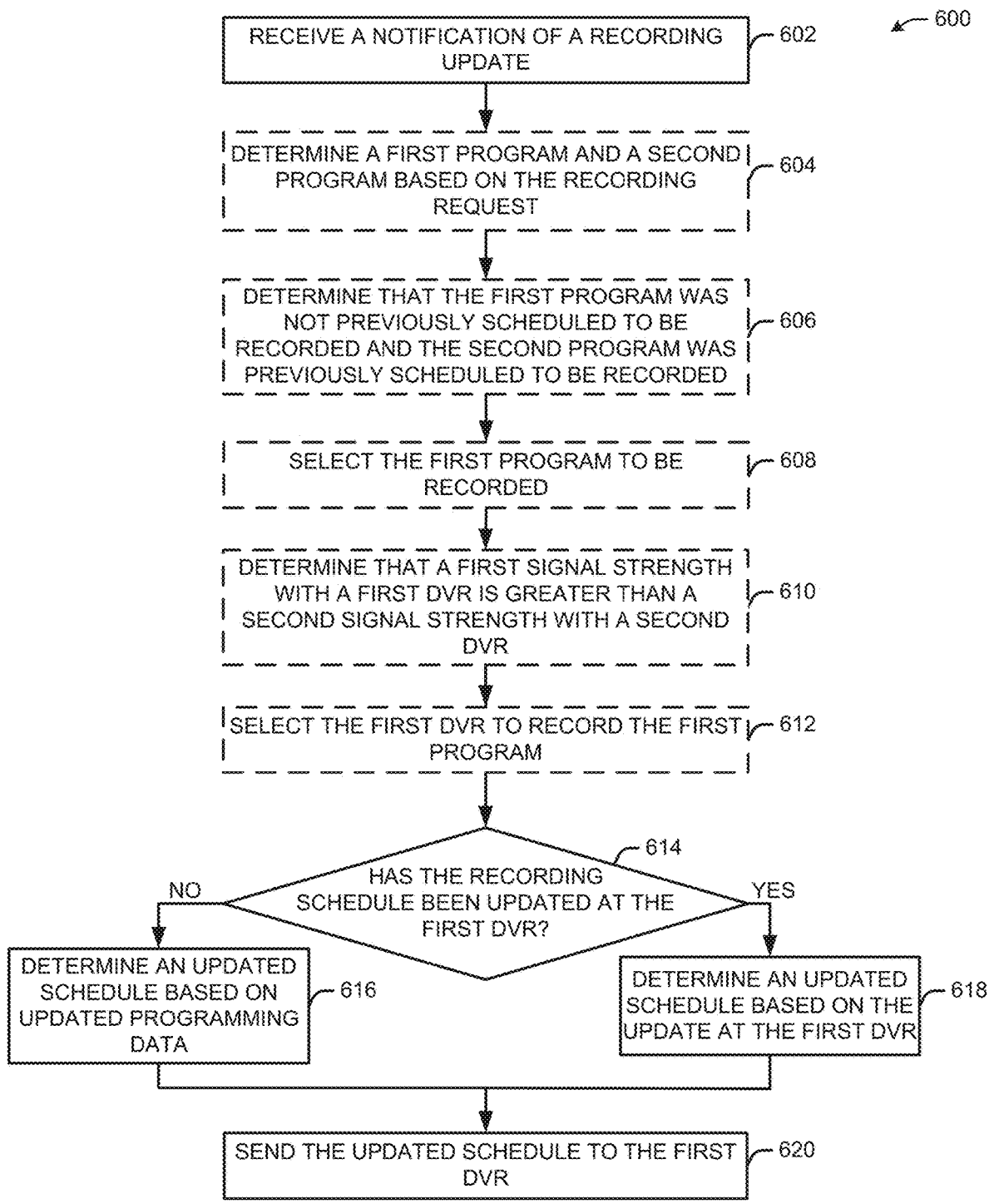
FIG. 6 illustrates a flow diagram for a process for remote scheduling of recorded content for DVRs, in accordance with one or more example embodiments of the present disclosure.

FIG. 6 illustrates a flow diagram for a process 600 for remote scheduling of recorded content for DVRs, in accordance with one or more example embodiments of the present disclosure.

At block 602, processing circuitry of a device or system processing circuitry of a device or system (e.g., the remote service 114 of FIG. 1, the remote service 212 of FIG. 2, the remote service 340 of FIG. 3) may receive a notification of a recording update. The recording request may be received from a device (e.g., the device 220 of FIG. 2), and may have originated from a remote control device (e.g., the remote control device 216 of FIG. 2). The recording request may be in the form of a voice command or wireless signal, and may include a program, a channel, a date, a time, an action (e.g., record, cancel, delete, add, reschedule, etc.) associated with causing recording, changing a recording scheduling, or removing a scheduled recording, for example. The processing circuitry may translate the recording request into instructions for a device. The instructions may include recording instructions for a remote DVR (e.g., the remote DVR 224 of FIG. 2), such a recording schedule which includes programs and the respective dates, times, and channels to record the programs. The notification of a recording update may be based on synchronization of the device or system and another device, based on an indication that a recording was requested at another device, or based on a received update of programming data (e.g., the next week of programming data).

At block 604, the processing circuitry may multiple programs, including a first program and a second program (e.g., television programs), based on the recording request. For example, the request may specify programs, and the processing circuitry may determine matching programs in a broadcast television programming schedule which includes a schedule of electronic programming data. The processing circuitry may determine multiple programs matching the recording request. For example, if the recording request includes "Lord of the Rings," the processing circuitry may identify multiple Lord of the Rings movies, documentaries, or related shows.

At block 606, the processing circuitry may disambiguate the recording request to determine which program is intended to be recorded. For example, the processing circuitry may determine that a first matching program was not previously scheduled to be recorded, and that a second matching program was previously scheduled to be recorded. Because the second program may have already recorded, the processing circuitry may determine that the first program is intended to be recorded. Therefore, at block 608, the processing circuitry may select the first program to add to a recording schedule.

At block 610, if multiple remote DVRs are available to record the first program, the processing circuitry may disambiguate the recording request to determine which available remote DVR with which to record the first program. The processing circuitry may identify, from the recording request, a user account and multiple remote DVRs associated with the user account. The processing circuitry may determine that a first connection with a first remote DVR is better (e.g., has a higher signal strength) than a second connection with a second remote DVR. For example, the processing circuitry may determine respective signal strengths and other channel characteristics of communication channels between the device or system and the respective remote DVRs. At block 612, the processing circuitry may select the first remote DVR to record the first program.

At block 614, the processing circuitry may determine whether the recording schedule for the remote DVR has been updated at the DVR. For example, if the remote DVR and any associated devices are operating in an offline mode or if the network connection is lost between the remote DVR and the device or system, or if a recording command is processed locally (e.g., by the device 220 of FIG. 2) and causes the remote DVR to change the recording schedule provided by the device or system, the remote DVR or associated device (e.g., the device 220 of FIG. 2) may send an indication that the recording schedule was modified at the remote DVR. For example, a schedule recording may be added to, deleted from, or changed to another channel, date, or time in the recording schedule sent to the remote DVR (e.g., during an offline mode or network disconnection). If the device or system is unaware of the schedule modification made at the remote DVR, the device or system may determine a recording schedule which does not include the modification and therefore may be outdated, and may send the outdated recording schedule to the remote DVR to implement. If the recording schedule has not been modified at the remote DVR, the process 600 may continue at block 616. If the recording schedule has been modified at the remote DVR, the process 600 may continue at block 618. It should be noted that the indication that the recording schedule has been modified at the remote DVR may be different than a command passed on by the remote DVR or another device to the device or system to be translated into a recording request which results in generating a recording schedule. Instead, the indication that the recording schedule has been modified at the remote DVR may indicate the program, channel, date, and/or time of a recording along with a timestamp which the processing circuitry may use to identify that the recording schedule update at the remote DVR was not accounted for by the device or system.

At block 616, the processing circuitry may determine an updated recording schedule based on updated programming data. For example, the processing circuitry may determine the next days or weeks of recordings for a recording schedule when the programming data becomes available. At block 618, the processing circuitry may determine an updated recording schedule based on the update made at the remote DVR. The updated recording schedule may combine next recordings based on new programming data and based on any updated recordings made at the remote DVR. The updated recording schedule may remove any canceled recordings and include any newly added recordings based on any recording commands received. At block 620, the processing circuitry may send the updated schedule to the remote DVR.

Figure 7:
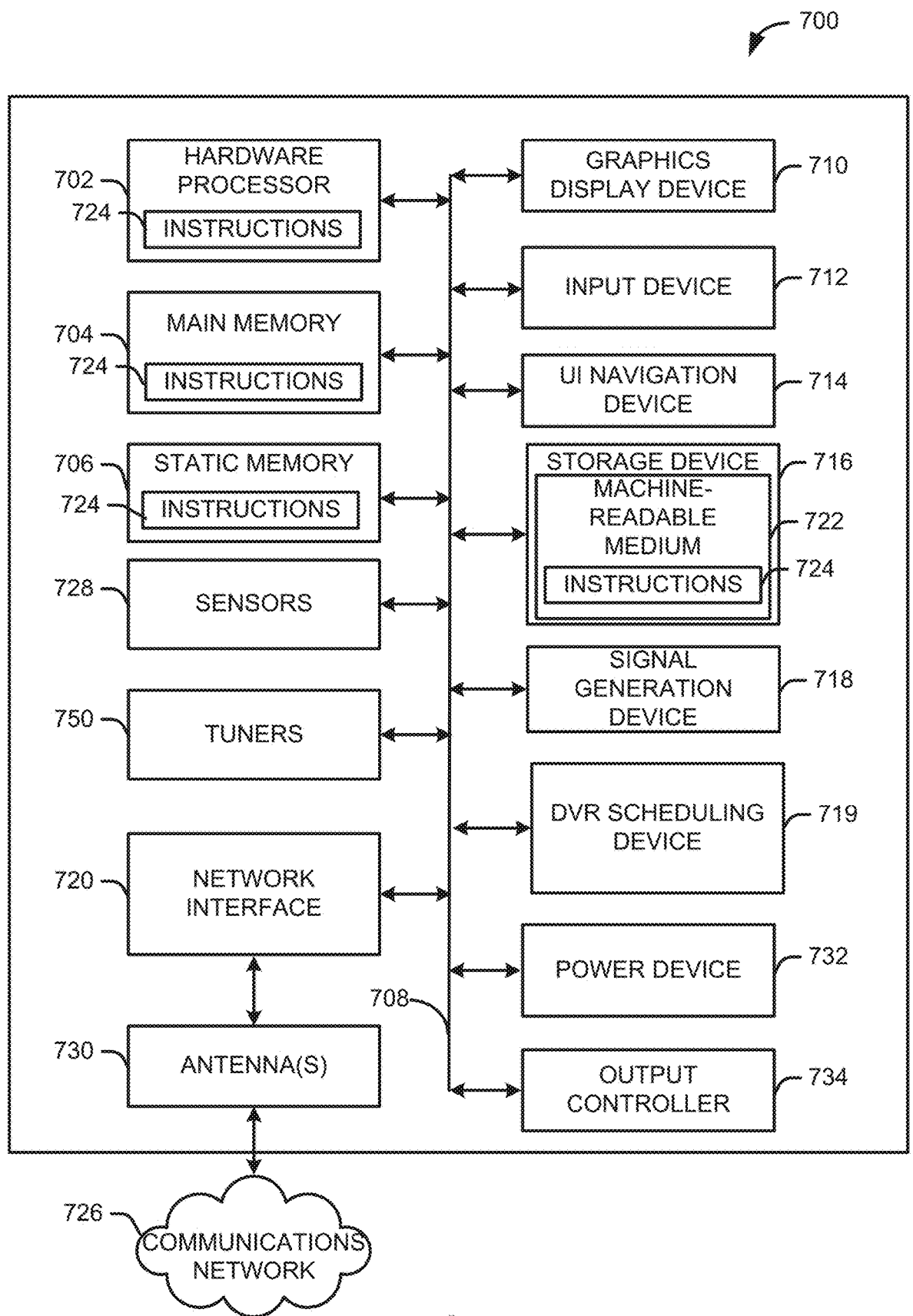
FIG. 7 illustrates a block diagram of an example machine upon which any of one or more techniques (e.g., methods) may be performed, in accordance with one or more example embodiments of the present disclosure.

FIG. 7 illustrates a block diagram of an example of a machine 700 (e.g., the display 110 of FIG. 1, the device 108 of FIG. 1, the remote DVR 112 of FIG. 1, the remote service 114 of FIG. 1, the playback device 202 of FIG. 2, the playback device 204 of FIG. 2, the AP 206 of FIG. 2, the AP 226 of FIG. 2, the remote control device 216 of FIG. 2, the device 220 of FIG. 2, the remote DVR 208 of FIG. 2, the remote DVR 224 of FIG. 2, the playback device 222 of FIG. 2, the remote service 212 of FIG. 2, the remote DVR 302 of FIG. 3, the one or more playback devices 304 of FIG. 3, the remote service 340 of FIG. 3) or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in Wi-Fi direct, peer-to-peer (P2P) (or other distributed) network environments. The machine 700 may be a server, a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker, or emitters such as light-emitting diodes if the machine 700 is a remote control device), a DVR scheduling device 719, a network interface device/transceiver 720 coupled to antenna(s) 730, and one or more sensors 728, such as a global positioning system (GPS) sensor, a compass, an accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The machine 700 may include one or more tuners 750, which may receive over-the-air video to be recorded by the machine 700 (e.g., if the machine 700 is a DVR device).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The machine 700 may include one or more tuners 750 (e.g., television tuners). The one or more tuners 750 may receive wireless signals (e.g., analog signals, digital signals) such as over-the-air programming. For example, the one or more tuners 750 may receive live over-the-air programming to be recorded according to a recording schedule. The one or more tuners 750 may be built into the machine 700 or may be externally connected to the machine 700. If the one or more tuners 750 include multiple tuners, the tuners may receive simultaneous signals for different television programs which may be recorded at the same time.

The DVR scheduling device 719 may carry out or perform any of the operations and processes (e.g., process 400 of FIG. 4, process 500 of FIG. 5, process 600 of FIG. 6) described and shown above.

The DVR scheduling device 719 may be implemented in a remote service which may receive recording commands, translate recording commands into recording instructions, determine recording schedules, and provide recording schedules to remote DVRs and other associated devices.

The DVR scheduling device 719 may be implemented in a remote DVR and may receive recording commands and recording schedules. The DVR scheduling device 719 may set tuners to record programs and may cause recorded programs to be stored on a remote DVR. The DVR scheduling device 719 may receive commands and recording schedules from a remote service and from a connected device such as a playback device or other device which facilitates playback of recorded video content.

The DVR scheduling device 719 may be implemented in a playback device or other device which may receive and translate recording commands and facilitate playback of recorded video content. The DVR scheduling device 719 may receive commands from a remote control device and from a remote service to direct recording of content by a remote DVR. The DVR scheduling device 719 may facilitate synchronization of recording schedules between devices and a remote service so that recording schedules reflect the most updated user commands along with channels, dates, and times for recordings.

The DVR scheduling device 719 may be implemented in a remote control device to cause user inputs to be sent as recording commands to cause the scheduling and recording of content.

It is understood that the above are only a subset of what the DVR scheduling device 719 may be configured to perform and that other functions included throughout this disclosure may also be performed by the DVR scheduling device 719.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
   determining, by at least one processor coupled to memory of a device, a broadcast television programming schedule for a first television program and a second television program available for recording at a remote client digital video recording (DVR) device;
   determining, using the broadcast television programming schedule, a first channel, a first date, and a first time at which the first television program will be presented;
   determining, using the broadcast television programming schedule, a second channel, the first date, and the first time at which the second television program will be presented;
   determining that the remote client DVR device has at least two tuners;
   generating a first recording schedule, wherein the first recording schedule comprises the first television program and the first date, the first time, and the first channel, and the second television program and the first date, the first time, and the second channel, and wherein the first recording schedule is stored on the device;
   sending the first recording schedule to the remote client DVR device;
   receiving, from the remote client DVR device, a second recording schedule that the remote client DVR device has generated by modifying the first recording schedule to include a second television program, a second date, a second time, and a second channel on which to record the second television program;
   determining, based on a first timestamp of the first recording schedule being earlier than a second timestamp of the second recording schedule, that the first recording schedule was not generated based on the second recording schedule;
   comparing, based on the determination that the first recording schedule was not based on the second recording schedule, the first recording schedule stored on the device to the second recording schedule received from the remote client DVR device;
   generating, based on the comparison, a third recording schedule, wherein the third recording schedule comprises the first television program, the first date, the first time, and the first channel, and the second television program, the second date, the second time, and the second channel; and
   sending the third recording schedule to the remote client DVR device.

2. The method of claim 1, wherein the remote client DVR device is a first remote client DVR device, the method further comprising:
   receiving a recording request to record a third television program;
   determining, using the broadcast television programming schedule, a third channel, the first date, and the first time, wherein the third television program will be presented at the first date and the first time at the third channel;
   determining that the first remote client DVR device does not have an unused tuner;
   determining that a second remote client DVR device has an unused tuner;
   generating a fourth recording schedule, wherein the fourth recording schedule comprises the third television program, the first date, the first time, and the third channel; and
   sending the fourth recording schedule to the second remote client DVR device.

3. The method of claim 1, wherein the remote client DVR device is a first remote client DVR device, further comprising:
   determining, using the broadcast television programming schedule, that the first date has changed to a third date;

determining two or more remote client DVR devices scheduled to record the first television program at the first date and the first time, the two or more remote client DVR devices including the first remote client DVR device and a second remote client DVR device;

generating a fourth recording schedule, wherein the fourth recording schedule comprises the first television program and the third date; and sending the fourth recording schedule to the first remote client DVR device and the second remote client DVR device.

4. A method, comprising:

generating, by at least one processor coupled to memory of a device, a first recording schedule for a first remote client digital video recording (DVR) device, wherein the first recording schedule comprises a first program to be recorded, and a first time at which to record the first program, and wherein the first recording schedule is stored on the device;

sending the first recording schedule to the first remote client DVR device;

receiving, from the first remote client DVR device, a second recording schedule that the first remote client DVR device has generated by modifying the first recording schedule to include a second program to be recorded, the second recording schedule comprising a second time at which to record the second program;

determining that the first recording schedule was not generated based on the second recording schedule;

generating, based on the determination that the first recording schedule was not generated based on the second recording schedule, a third recording schedule, wherein the third recording schedule comprises the first program, the first time, the second program, and the second time;

sending the third recording schedule to the first remote client DVR device;

receiving, by the device, a recording request;

determining, based on the recording request, a user account;

determining that the first remote client DVR device and a second remote client DVR device are associated with the user account;

determining that a first signal strength associated with the first remote client DVR device is greater than a second signal strength associated with the second remote client DVR device; and determining that the first remote client DVR device is to record the first program.

5. The method of claim 4, further comprising comparing the first recording schedule stored on the device to the second recording schedule received from the first remote client DVR device, wherein generating the third recording schedule is based on the comparison.

6. The method of claim 4, wherein the recording request comprises a third program, the method further comprising:

determining that the third program will be presented at the first time;

determining that a number of programs to be recorded by the first remote client DVR device at the first time is greater than a number of tuners at the first remote client DVR device; and determining a second time at which the third program will be presented, wherein the second recording schedule further comprises the third program at the second time.

7. The method of claim 4, wherein the recording request comprises a third program, the method further comprising:

determining that the third program will be presented at the first time;

determining that a number of tuners at the second remote client DVR device exceeds a number of programs to be recorded at the first time;

generating a fourth recording schedule, wherein the fourth recording schedule comprises the third program and the first time; and sending the fourth recording schedule to the second remote client DVR device.

8. The method of claim 4, wherein the recording request comprises the first program, wherein the recording request is associated with a voice command.

9. The method of claim 4, further comprising:

determining, by the device, that the first time has changed to a second time;

determining two or more remote client DVR devices scheduled to record the first program at the first time, the two or more remote client DVR devices including the first remote client DVR device and the second remote client DVR device;

generating a fourth recording schedule, wherein the fourth recording schedule comprises the first program and the second time; and sending the fourth recording schedule to the first remote client DVR device and the second remote client DVR device.

10. The method of claim 4, the method further comprising:

determining, based on the recording request, the first program and a third program;

sending a first indication of the first program and the third program; and receiving a second indication of a selection of the first program, wherein generating the first recording schedule is based on the selection.

11. The method of claim 4, the method further comprising:

determining, based on the recording request, the first program and a third program;

determining that the first remote client DVR device is scheduled to record the third program; and determining that the first remote client DVR device is not scheduled to record the first program, wherein generating the first recording schedule is based on the determining that the first remote client DVR device is scheduled to record the third program and not the first program.

12. The method of claim 4, wherein the second recording schedule further comprises a third program and the second time, further comprising determining a third time at which the third program will be presented, wherein the third recording schedule further comprises the third program at the third time.

13. The method of claim 4, further comprising:

determining, by the device, based on the first recording schedule, that a third program is to be recorded by the first remote client DVR device at the second time;

sending an input request to the first remote client DVR device, wherein the input request comprises the second program at the second time and the third program at the second time; and receiving an indication of a selection of the second program at the second time; and determining a third time at which the third program will be presented, wherein the third recording schedule further comprises the third program at the third time.

14. The method of claim 4, wherein the recording request comprises a third program, the method further comprising:
  determining that the third program will be presented at the first time; and
  determining that a number of programs to be recorded by the first remote client DVR device at the first time is less than or equal to a number of tuners at the first remote client DVR device,
  wherein the third recording schedule further comprises the third program at the first time.

15. The method of claim 4, wherein the second recording schedule indicates that the first remote client DVR device has generated the second recording schedule during a time period when the first client DVR device was disconnected from the device.

16. A device comprising memory coupled to at least one processor, the at least one processor configured to:
  determine a first recording schedule for a first remote client digital video recording (DVR) device, wherein the first recording schedule comprises a first program to be recorded, and a first time at which to record the first program, and wherein the first recording schedule is stored on the device;
  send the first recording schedule to the first remote client DVR device;
  receive, from the first remote client DVR device, a second recording schedule that the first remote client DVR device has generated by modifying received a request to include a second program to be recorded and has modified the first recording schedule to include a second program to be recorded, the second recording schedule comprising a second time at which to record the second program;
  determine that the first recording schedule was not generated based on the second recording schedule;
  determine, based on the determination that the first recording schedule was not based on the second recording schedule, a third recording schedule, wherein the third recording schedule comprises the first program, the first time, the second program, and the second time;
  send the third recording schedule to the first client remote DVR device;
  receive a recording request;
  determine, based on the recording request, a user account;
  determine that the first remote client DVR device and a second remote client DVR device are associated with the user account;
  determine that a first signal strength associated with the first remote client DVR device is greater than a second signal strength associated with the second remote client DVR device; and
  determine that the first remote client DVR device is to record the first program.

17. The device of claim 16, wherein the at least one processor is further configured to compare the first recording schedule stored on the device to the second recording schedule received from the first remote client DVR device, wherein to generate the third recording schedule is based on the comparison.

18. The device of claim 16, wherein the recording request comprises a third program, and wherein the at least one processor is further configured to:
  determine that the third program will be presented at the first time;
  determine that a number of programs to be recorded by the first remote client DVR device at the first time is greater than a number of tuners at the first remote client DVR device; and
  determine a second time at which the third program will be presented, wherein the third recording schedule further comprises the third program at the second time.

19. The device of claim 16, wherein the at least one processor is further configured to:
  determine a first time stamp associated with the first recording schedule;
  determine a second time stamp associated with receiving the second recording schedule; and
  determine that the second time stamp is later than the first time stamp, wherein to generate the third recording schedule is based on the determination that the second time stamp is later than the first time stamp.

20. The device of claim 16, wherein the recording request comprises a third program, and wherein the at least one processor is further configured to:
  determine that the third program will be presented at the first time; and
  determine that a number of programs to be recorded by the first remote client DVR device at the first time is less than or equal to a number of tuners at the first remote client DVR device,
  wherein the third recording schedule further comprises the third program at the first time.

* * * * *